United States Patent [19]

Clarke et al.

[11] Patent Number: 5,548,432
[45] Date of Patent: Aug. 20, 1996

[54] PASSIVE OPTICAL NETWORK SWITCHABLE BETWEEN AN OPERATIONAL MODE AND A DIAGNOSTIC MODE

[75] Inventors: Donald E. A. Clarke; Michael A. Hale, both of Essex; Jeremy B. Chuter, Suffolk, all of England

[73] Assignee: British Telecommunications public limited company, London, England

[21] Appl. No.: 395,539

[22] Filed: Feb. 28, 1995

Related U.S. Application Data

[63] Continuation of Ser. No. 39,488, field as PCT/GB91/01815 Oct. 15, 1991 published as WO92/07432, Apr. 30, 1992, abandoned.

[30] Foreign Application Priority Data

Oct. 18, 1990 [GB] United Kingdom ............... 9022681

[51] Int. Cl.$^6$ ................................ H04B 9/00
[52] U.S. Cl. .................. 359/137; 359/110; 356/73.1
[58] Field of Search ............................ 359/110, 173, 359/135, 137, 118; 356/73.1

[56] References Cited

U.S. PATENT DOCUMENTS

| | | | |
|---|---|---|---|
| 4,451,916 | 5/1984 | Casper et al. | 359/158 |
| 4,749,247 | 6/1988 | Large | 359/131 |
| 4,797,951 | 1/1989 | Duxbury et al. | 359/154 |
| 4,977,593 | 12/1990 | Ballance | 359/118 |
| 5,285,305 | 2/1994 | Cohen et al. | 359/110 |

FOREIGN PATENT DOCUMENTS

| | | | |
|---|---|---|---|
| 0318332 | 5/1989 | European Pat. Off. | H04B 9/00 |
| 0467080 | 1/1992 | European Pat. Off. | 359/121 |
| 1287603 | 1/1969 | Germany | H04L 7/06 |
| WO89/09518 | 10/1989 | WIPO | H04B 7/24 |
| WO90/06498 | 6/1990 | WIPO | G01M 11/00 |

OTHER PUBLICATIONS

IEEE Global Telecommunications Conference & Exhibition, Hollywood, Florida, Nov. 28–Dec. 1, 1988, "Communications for the Information Age", pp. 1579–1583.

Sankawa et al, Fault Location Technique for In-Service Branched Optical Fiber Networks, 1990 IEEE, pp. 766–768.

*Primary Examiner*—Leo Boudreau
*Assistant Examiner*—Rafael Bacares
*Attorney, Agent, or Firm*—Nixon & Vanderhye P.C.

[57] ABSTRACT

A head-end station for a passive optical network system arranged to transmit and receive TDMA frames having a header portion and a plurality of basic frames, each basic frame includes traffic bits and control bits. The head-end station includes a data transmitter which assembles and transmits downstream frames and also generates a diagnostic signal for transmission in a downstream frame, the station being switchable to a diagnostic mode in which it transmits the diagnostic signal in a downstream frame in the absence of other traffic, and also including a data receiver which receives upstream frames and detects a return of the diagnostic signal. In a preferred example, the head-end station may transmit a diagnostic signal in the header portion of each downstream frame. Also, in a test mode the transmit signal is looped back to the receiver to enable testing of the transmit receive function. Loop back is provided at three levels, namely the transmitter drive level, the monitored output level and at the laser output receiver input level.

21 Claims, 5 Drawing Sheets

PASSIVE OPTICAL NETWORK SWITCHABLE BETWEEN AN OPERATIONAL MODE AND A DIAGNOSTIC MODE

This is a continuation of application Ser. No. 08/039,488, filed as PCT/GB91/01815 Oct. 17, 1991 published as WO92/07432, Apr. 30, 1992, now abandoned.

BACKGROUND OF THE INVENTION

1. Field of the Invention

The present invention relates to a passive optical network (PON) system, and in particular to a head-end station for use in such a PON system.

2. Related Art

The present applicant has developed a bit transport system (BTS) for use in a TPON (Telephone on a Passive Optical Network) system. In this BTS, a head-end station broadcasts time division multiple access (TDMA) frames to all the terminations on the network. The transmitted frames include both traffic data and control data. Each termination recognises and responds to an appropriately addressed portion of the data in the broadcast frame and ignores the remainder of the frame.

In the upstream direction, each termination transmits data in a predetermined time slot and the data from the different terminations are assembled at the head-end into a TDMA frame of predetermined format.

SUMMARY OF THE INVENTION

According to the present invention, there is provided a head-end station for a passive optical network system arranged to transmit and receive TDMA frames comprising a header portion and a plurality of basic frames, each basic frame comprising a plurality of traffic bits and a plurality of control bits, the head-end station being switchable between an operational mode in which it transmits and receives TDMA frames and a diagnostic mode in which it generates and transmits a diagnostic signal onto the passive optical network system and detects any return of the diagnostic signal.

Conventionally, when there is a complete break in the network so that the transmission between the head-end station and terminations connected to the network is interrupted, the head-end station is disabled and dedicated test equipment connected to the network in order to locate the fault. The present invention provides a head-end station which is itself able to locate a fault in the network using a diagnostic mode which functions in the absence of normal data transmission. Preferably, the diagnostic mode is entered automatically upon sensing the absence of upstream frames, whereby the fault location is known and can be relayed to maintenance staff virtually immediately after the fault has occurred.

Preferably, the head-end station includes means to generate an autocorrelative OTDR probe as the diagnostic signal.

The present applicant's International Application No. GB90/01758 (Publication No. WO91/08623) discloses a structure for the head-end station in which a control processor arranged to receive control data receives a parallel data input from a control data buffer and a traffic interface receives incoming traffic data. A serial-to-parallel converter receives incoming TDMA frames, the parallel output from the serial-to parallel converter being connected in parallel to the respective inputs of the control data buffer and the traffic interface. A complementary structure is adopted for a data transmitter in the head-end station.

Preferably, in such a head-end station, the data transmitter and data receiver are synchronised with a switchable delay between the transmitter and receiver such that in an operational mode, the timing of the receiver is delayed with respect to the transmitter by a period generally equal to the loop delay of the PON system, and in a test mode the delay between the transmitter and the receiver is substantially eliminated so that data transmitted from the transmitter and looped-back to the receiver is aligned at the frame level.

The present invention through the use of upstream and downstream frames which are identical in their general structure, although differing in some details, makes it possible to provide a loop-back test mode, in which by connecting the output of the transmitter to the input of the receiver, and synchronising the timing of the transmitter and receiver, a direct comparison of transmitted and received data can be made.

BRIEF DESCRIPTION OF THE DRAWINGS

A head-end station in accordance with the present invention will now be described in detail with reference to the accompanying drawings in which.

DETAILED DESCRIPTION OF EXEMPLARY EMBODIMENTS

Figure 1:
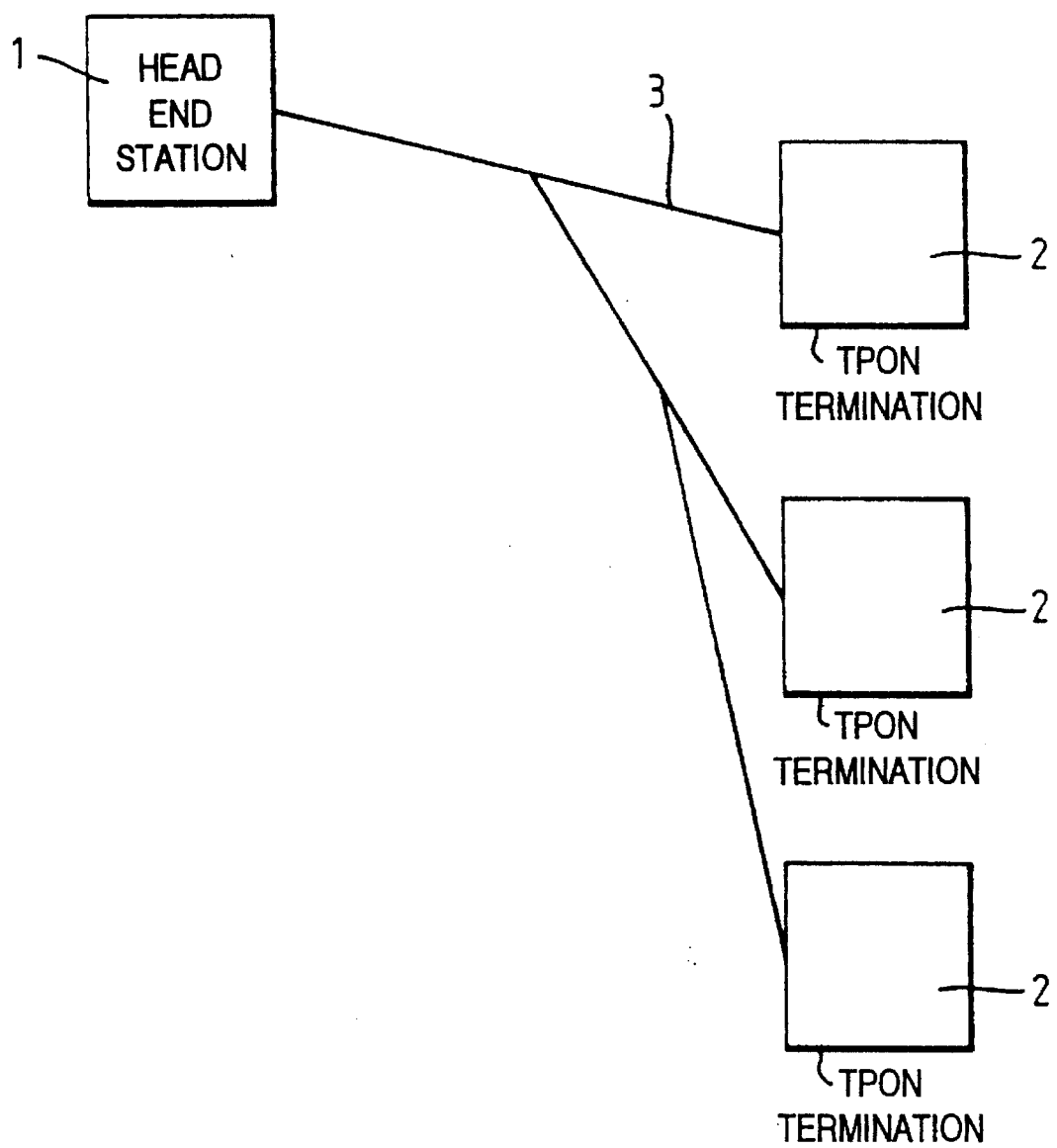
FIG. 1 is a block diagram showing a TPON system.

A TPON system comprises a head-end station 1, a number of terminations 2, and a passive optical fibre network 3 linking the head-end station 1 to the terminations 2. Although, for clarity, only three terminations are shown in FIG. 1, in practice many more terminations are connected to each single head-end station. Typically the head-end station 1 is located in a local telephone exchange and the terminations 2 are subscriber stations in domestic or commercial premises or in street cabinets in the neighbourhood of the local exchange.

The head-end station 1 broadcasts data over the fibre network 3 as time division multiple access frames (TDMA), the frames having a predetermined format. The frames include control channels addressed to specific ones of the terminations 2 to control, amongst other parameters, the amplitude and timing of the optical signals transmitted onto the fibre network 3 by the terminations 2.

In the upstream direction, each termination 2 transmits data in a predetermined time slot. The data assembled into a TDMA frame at the head-end station 1. The timing of transmissions from the terminations 2 is controlled to compensate for the different delays associated with the different positions of the terminations 2 on the fibre network 3.

Figure 4:
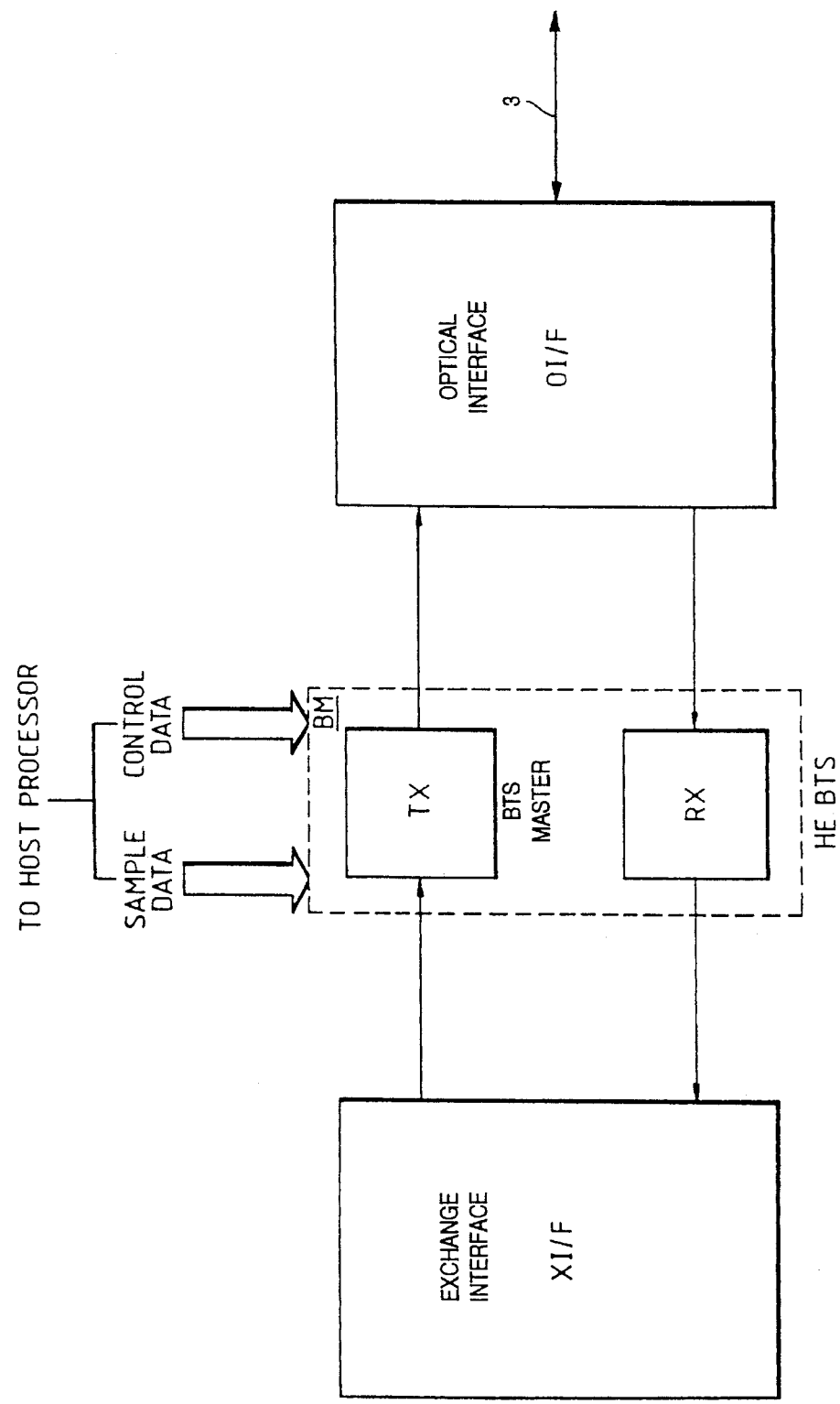
FIG. 4 is a block diagram showing the head-end station in greater detail.

FIG. 4 shows the structure of the head-end station 1. The head-end station is coupled to the fibre network 3 by an optical interface OI/F which includes an optical source and a photo-sensitive detector. A BTS master BM comprises a data transmitter TX which assembles incoming traffic received via an exchange interface XI/F into downstream TDMA frames. A data receiver RX carries out the converse process, demultiplexing incoming TDMA frames and outputting traffic via the exchange interface XI/F.

Figure 5:
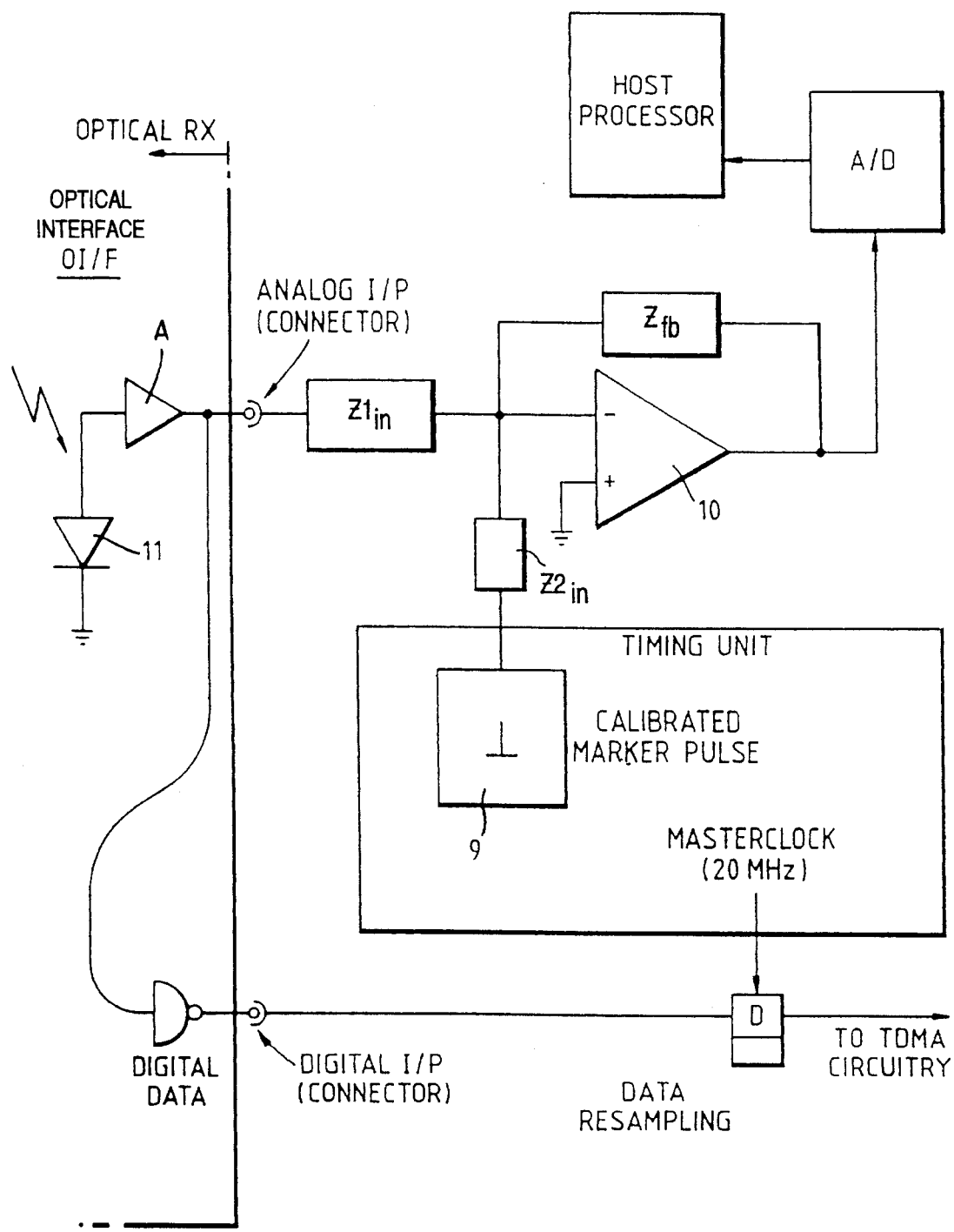
FIG. 5 is a diagram showing the front-end of the head-end station.

FIG. 5 shows the interface between the front end of the receiver RX and optical interface OI/F. The output from a photo-sensitive detector 11 is amplified by an in-line amplifier A (via input impedance $Z1_{in}$) and branched to provide an analogue input and a digital input to the front end. A calibrated marker pulse generated by wait 9 in a timing unit is superimposed by an amplifier 10 (a input impedence $Z2_{in}$) on the signal at the analogue input and the resulting signal (amplified by a gain determined in part by the input impedances $Z1_{in}$, $Z2_{in}$ and the usual feedback impedance $Z_{fb}$) sent to a high-speed A/D converter which samples the analogue signal at a sampling rate considerably higher than the bit rate of the data making up the frame. The output of the A/D converter is processed by a host processor to recover any returned diagnostic signal. The signal from the digital input is resampled by flip-flop D retimed by the master clock at the frame bit rate to provide the input for a signal recovery stage.

Figure 2:
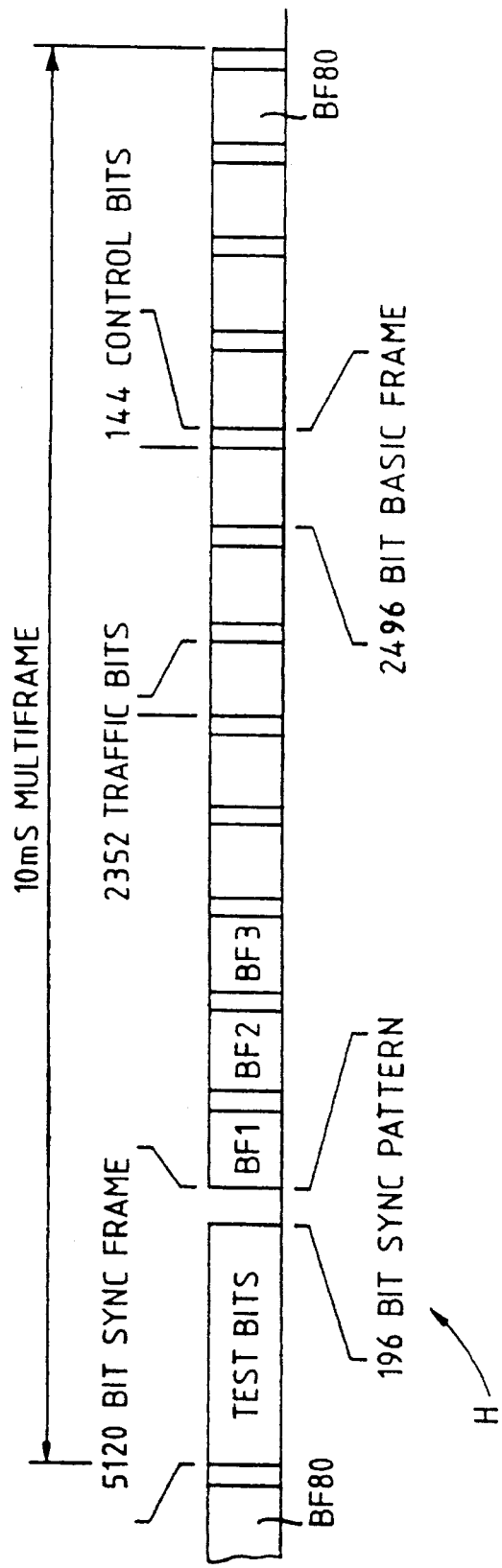
FIG. 2 is a diagram showing the structure of a downstream TDMA frame.

FIG. 2 shows the structure of a downstream TDMA frame assembled by the transmit side of the BTS master. The traffic is carried in a series of 80 basic frames BF1, BF2 ... BF80. As well as 2352 traffic bits, each basic frame contains in addition 144 control bits. These control bits can be used, amongst other functions, to control the amplitude and timing of transmissions in the upstream direction from the terminations connected to the network. The series of 80 basic frames is preceded by a header H. The primary purpose of this header is to provide a synchronisation frame having a predetermined fixed bit pattern which is recognised by the terminations and used to recover the system clock. This synchronisation pattern includes, in the present embodiment, a series of 196 nulls (i.e. zero bits) immediately preceding the first of the basic frames BF1.

The data transmitter TX includes means for generating as part of the predetermined bit pattern in the header, a diagnostic signal. This diagnostic signal is then transmitted on the network with each outgoing TDMA frame. Then if there is partial discontinuity in the network, such as might be caused by an imperfectly aligned coupler, or a flaw within an optical fibre, the diagnostic signal is reflected from the partial discontinuity back towards the head-end station, where it is detected by the data receiver RX. The head-end station is arranged to generate an appropriate alarm signal when such a fault is detected.

The diagnostic signal takes the form of an autocorrelative OTDR probe. It is encoded on the bit sequence preceding the 196 nulls in the header H. The incoming signals at the receiver RX, including any return of the OTDR probe are, as already described, sampled at high speed. The resulting data are then processed to detect any occurrence of the returned probe. Where such a return is present, it comprises not only the impulse response of the network system but also includes terms corresponding to the encoding function of the autocorrelative bit pattern. If the data is then treated with a filter matched to the encoding function, these terms are effectively converted into the autocorrelation function of the encoding sequence. The encoding sequence is chosen so that this autocorrelation function approximates to a simple delta function, allowing direct recovery of the impulse response of the network. From this recovered response, the position and magnitude of the partial discontinuity can be determined.

Figure 3:
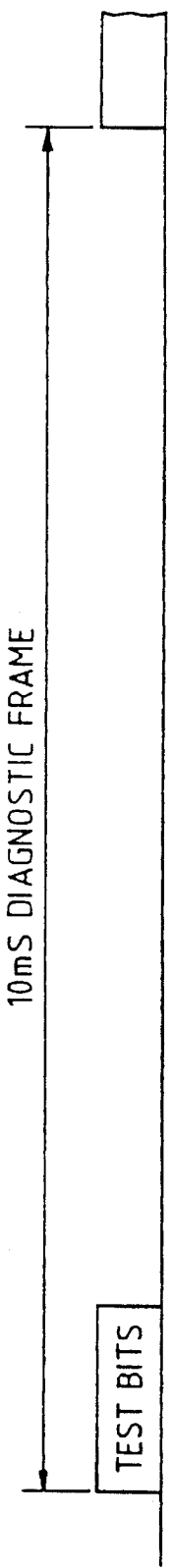
FIG. 3 shows a frame transmitted in a diagnostic mode.

Occasionally there may be a complete break in the network. In these circumstances the normal transmission of data between the head-end station 1 and the terminations 2 is interrupted and the head-end station must cease transmission of traffic. The head-end station 1 detects the absence of upstream frames and in response automatically switches into a diagnostic mode. A manually-operated switch can be provided so that an operator can manually switch the head-end into its diagnostic mode. In place of the normal downstream frame structure it broadcasts a frame containing a diagnostic signal but without any basic frames. For ease of implementation, the diagnostic signal may comprise simply the same header used in the conventional downstream frame. This arrangement is shown in FIG. 3. Alternatively the diagnostic signal may comprise a single pulse. As a further alternative, the frame may use a different, more extended probe sequence, effectively providing a higher signal to noise ratio on any return, and so increasing the speed with which the fault can be analysed.

Figure 6:
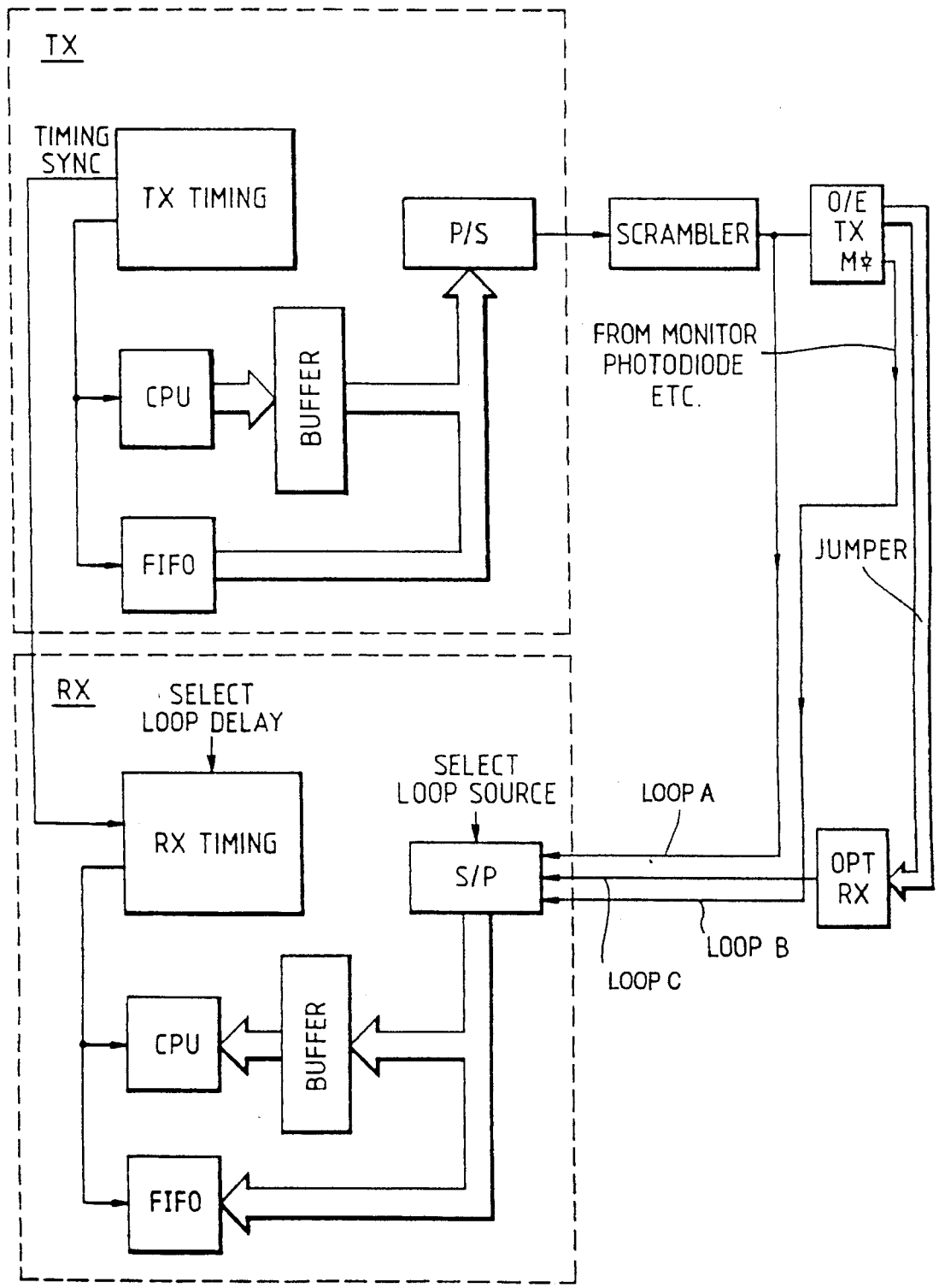
FIG. 6 is a block diagram showing data transmitter and data receiver stages in a loop-back configuration.

FIG. 6 shows the data transmitter and data receiver in the head-end station 1 connected in a loop-back configuration. Such a configuration is used to test the functioning of the head-end station 1, with the output from the transmitter stage TX being connected directly to the input of the receiver RX. The output of the transmitter stage TX passes through a scrambler which changes the bit order in accordance with a pseudo-random binary sequence (PRBS) before passing the signal to an opto-electronic stage O/E which outputs an optical signal. The scrambling of the output serves both to aid clock recovery from the signal and also to provide additional security. A synchronisation signal is transmitted form the transmitter timing unit directly to the receiver timing unit. Normally the synchronisation signal is arranged so that the transmitter and receiver are aligned at the bit level but not at the frame level. In normal operation there is a delay between the transmitter and the timer equal in duration to several basic frames. This delay compensates for the loop delay of the TPON system. However, in the loop-back mode shown in FIG. 6, the synchronisation signal from the transmitter timing unit is modified so that the transmitter and receiver are aligned at the frame level as well as at the bit-level, eliminating the delay which is normally introduced. Then when the output of the transmitter is fed into the receiver a direct bit-by-bit comparison may be made of the outgoing and incoming frames to provide a rapid an effective test of the operation of the head-end station 1. p In the example shown in FIG. 6, connections are provided for using different loop sources. Loop A excludes the optical stage and connects the output of the scrambler directly to the serial-to-parallel converter of the receiver stage.

Loop B includes the optical stage of the transmitter but omits the optical stage of the receiver. Semiconductor laser devices of the type used for the optical output stage commonly include a monitor photodiode. When loop B is used, the electrical output from this monitor photodiode is connected to the serial-to-parallel converter of the converter. The third loop at the head-end station, loop C, includes the full optical input and output stages. An external jumper/attenuator is used to connect the optical stage of the transmitter to the optical stage of the receiver.

In addition to the different loops available at the head-end station 1, loop-backs may be provided at the terminations or at other points in the network. In general the different loops will have different delays associated with them and accordingly the receiver timing stage is arranged to select different loop delays appropriate to the different loop sources so that in each case the incoming and outgoing frames are aligned at both the frame level and the bit level.

We claim:

1. A head-end station for a passive optical network system, the head-end station including means to transmit and receive diagnostic signals and TDMA data frames comprising a header portion and a plurality of basic frames, each basic frame comprising a plurality of traffic bits and a plurality of control bits, the head-end station further including means for detecting an abnormality in an operational mode and for causing the head-end station to switch between the operational mode in which it transmits and receives TDMA data frames and a diagnostic mode in which transmission of data frames is terminated and wherein said head-end station generates and transmits a diagnostic signal onto the passive optical network system and detects any return of the diagnostic signal.

2. A head-end station as in claim 1, including means to generate an autocorrelative OTDR probe as the diagnostic signal.

3. A head-end station as in claim 1 including means for encoding a header portion of a TDMA frame transmitted in the operational mode with the diagnostic signal.

4. A head-end station as in claim 1 in which the absence of received upstream data frames is sensed and, in response thereto, the head-end station automatically switches from the operational mode to the diagnostic mode.

5. A head-end station according to claim 1 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

6. A head-end station as in claim 2 including means for encoding a header portion of a TDMA frame transmitted in the operational mode with the diagnostic signal.

7. A head-end station as in claim 2 in which the absence of received upstream data frames in sensed and, in response thereto, the head-end station automatically switches from the operational mode to the diagnostic mode.

8. A head-end station as in claim 3 in which the absence of received upstream data frames is sensed and, in response thereto, the head-end station automatically switches from the operational mode to the diagnostic mode.

9. A head-end station as in claim 6 in which the absence of received upstream data frames is sensed and, in response thereto, the head-end station automatically switches from the operational mode to the diagnostic mode.

10. A head-end station as in claim 2 in which the passive optical network system exhibits a loop delay timing between transmission of data from the head-end station and reception of network TDMA data form a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and loop-back to the receiver is aligned at the frame level.

11. A head-end station as in claim 3 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

12. A head-end station as in claim 4 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

13. A head-end station as in claim 6 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

14. A head-end station as in claim 7 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

15. A head-end station as in claim 8 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

16. A head-end station as in claim 9 in which the passive optical network system exhibits a loop delay timing between transmission of data from the head-end station and reception of network TDMA data from a remotely situated termination, said head-end station including a data transmitter and data receiver synchronized by a timing means with a switchable delay between the transmitter and receiver such that in said operational mode the timing of the receiver is delayed with respect to the transmitter by a period approximately equal to the loop delay time of the passive optical network system, and in a test mode the delay set by the timing means between the transmitter and receiver is substantially eliminated so that data transmitted from the transmitter and looped-back to the receiver is aligned at the frame level.

17. A method for operating a head-end station of a passive optical network, said method comprising the steps of:

transmitting from the head-end station TDMA data frames of optical signals, said data frames including a header portion and a plurality of basic frames, each basic frame having a plurality of traffic bits and a plurality of control bits; and detecting an abnormality in an operational mode and switching between (a) said operational mode in which the head-end station transmits and receives TDMA data frames of optical signals and (b) a diagnostic mode in which transmission of data frames is terminated and the head-end station generates and transmits a diagnostic signal onto the passive optical network system and detects any return of the diagnostic signal.

18. A method as in claim 17 wherein said diagnostic signal is generated as an autocorrelative OTDR probe signal.

19. A method as in claim 17 including encoding a header portion of a TDMA frame transmitted in the operational mode with the diagnostic signal.

20. A method as in claim 17 including sensing the absence of received upstream data frames and, in response thereto, automatically switching the head-end station from said operational mode to said diagnostic mode.

21. A method as in claim 17 wherein the passive optical network system exhibits a loop delay time between transmission of data from the head-end station and reception of returned TDMA data from a remotely situated termination, said method including:

synchronizing a data transmitter with a data receiver at the head-end station with a switchable delay between the transmitter and receiver such that in said operational mode the timing of the receiver is delayed with respect to the transmitter by a period approximately equal to the loop delay time of the passive optical network system; and, in a test mode, the delay between the transmitter and receiver is substantially eliminated so that data transmitted from the transmitter and looped back to the receiver is aligned at the frame level.

* * * * *